United States Patent
Lorphelin

(10) Patent No.: US 9,723,059 B2
(45) Date of Patent: Aug. 1, 2017

(54) METHOD AND COLLABORATION SYSTEM

(75) Inventor: Vincent Lorphelin, Paris (FR)

(73) Assignee: DVDPERPLAY SA, Paris (FR)

( * ) Notice: Subject to any disclaimer, the term of this patent is extended or adjusted under 35 U.S.C. 154(b) by 58 days.

(21) Appl. No.: 13/989,043

(22) PCT Filed: Nov. 29, 2011

(86) PCT No.: PCT/EP2011/071324
§ 371 (c)(1),
(2), (4) Date: May 22, 2013

(87) PCT Pub. No.: WO2012/072651
PCT Pub. Date: Jun. 7, 2012

(65) Prior Publication Data
US 2013/0254298 A1      Sep. 26, 2013

Related U.S. Application Data

(60) Provisional application No. 61/417,782, filed on Nov. 29, 2010.

(51) Int. Cl.
*H04L 29/08* (2006.01)
*G06Q 10/06* (2012.01)
*G06Q 10/10* (2012.01)

(52) U.S. Cl.
CPC ............ *H04L 67/10* (2013.01); *G06Q 10/06* (2013.01); *G06Q 10/10* (2013.01)

(58) Field of Classification Search
CPC ................................ H04L 67/10; G06Q 10/06
(Continued)

(56) References Cited

U.S. PATENT DOCUMENTS 5,996,002 A * 11/1999 Katsurabayashi .... G06F 3/1454
709/204
6,212,528 B1 4/2001 Brophy et al.
(Continued)

FOREIGN PATENT DOCUMENTS

| WO | 2008/151161 | 6/2008 |
|---|---|---|
| WO | 2009/076555 | 12/2008 |
| WO | 2010/053922 | 5/2010 |

OTHER PUBLICATIONS

Eliasson, "Personalized Movie Recommender", 2010.*
(Continued)

*Primary Examiner* — O.C. Vostal
(74) *Attorney, Agent, or Firm* — Steinfl + Bruno LLP

(57) ABSTRACT

A method and collaboration system for determining the usefulness value of different contributions to the creation of a collective work produced by different contributors in a collaborative work platform is described. The value of each contribution is determined according to usefulness indicators that respectively characterize the contribution itself, the specific data that it provides to the collective work, the work thus produced and the contributor, and, according to valuation parameters (set of numeric constants, mathematical functions and algorithms) mutually defined by a manager of the system and the contributors. These usefulness indicators are collected periodically during the development and life of the work, and their variation over time may cause the usefulness value of contributions to vary. The determination of the usefulness value of each contribution is intended to calculate the individual compensation for contributors in the production of the work.

13 Claims, 10 Drawing Sheets

(58) Field of Classification Search
USPC .......................................................... 709/205
See application file for complete search history.

(56) References Cited

U.S. PATENT DOCUMENTS

| | | | | |
|---|---|---|---|---|
| 6,237,025 | B1* | 5/2001 | Ludwig | G06Q 10/10 709/204 |
| 6,292,830 | B1* | 9/2001 | Taylor | G06N 5/043 709/224 |
| 6,728,784 | B1* | 4/2004 | Mattaway | H04L 12/1822 370/260 |
| 7,222,156 | B2* | 5/2007 | Gupta | G06F 17/241 709/206 |
| 7,630,986 | B1* | 12/2009 | Herz | G06Q 10/10 |
| 8,055,712 | B2* | 11/2011 | Kagawa | G06F 17/30873 709/205 |
| 8,140,380 | B2 | 3/2012 | Keller et al. | |
| 8,655,826 | B1* | 2/2014 | Drewry | G06F 21/10 706/48 |
| 2003/0014311 | A1 | 1/2003 | Chua | |
| 2003/0200352 | A1* | 10/2003 | Mohan | G06F 9/542 719/318 |
| 2004/0006566 | A1* | 1/2004 | Taylor | G06Q 10/10 |
| 2004/0049539 | A1* | 3/2004 | Reynolds | G06Q 10/10 709/203 |
| 2004/0117330 | A1* | 6/2004 | Ehlers et al. | 705/412 |
| 2004/0202348 | A1* | 10/2004 | Kuzma | H04N 21/2404 382/100 |
| 2007/0087756 | A1* | 4/2007 | Hoffberg | G06Q 10/0631 455/450 |
| 2007/0143218 | A1* | 6/2007 | Vasa | G06F 21/10 705/51 |
| 2007/0294613 | A1* | 12/2007 | Le Huerou | G06Q 10/10 715/203 |
| 2008/0313057 | A1* | 12/2008 | Gooch | G06Q 10/00 705/26.1 |
| 2009/0086235 | A1 | 4/2009 | Yamamoto et al. | |
| 2009/0094039 | A1* | 4/2009 | MacDonald et al. | 705/1 |
| 2009/0199104 | A1 | 8/2009 | Pluschkell, Jr. et al. | |
| 2009/0248802 | A1* | 10/2009 | Mahajan | G06F 9/4445 709/204 |
| 2009/0271481 | A1 | 10/2009 | Becker | |
| 2009/0299760 | A1 | 12/2009 | Spradlin et al. | |
| 2010/0235285 | A1* | 9/2010 | Hoffberg | G06Q 20/401 705/75 |
| 2010/0287104 | A1* | 11/2010 | Leroy | 705/300 |
| 2011/0153508 | A1* | 6/2011 | Jhunjhunwala | G06Q 30/02 705/306 |
| 2011/0191417 | A1* | 8/2011 | Rathod | G06Q 30/02 709/204 |
| 2013/0218974 | A1* | 8/2013 | Cao et al. | 709/204 |

OTHER PUBLICATIONS

Palme, "Choices in the Implementation of Rating", 1997.*
Sztaki, "ERCIM", "Filtering and Collaborative Filtering", 1997.*
Zheng et al., "Method for obtaining user specific metaknowledge interest", CN 101655856 A, 2009.*
PCT International Search Report mailed on Dec. 30, 2011 for PCT/EP2011/071324 filed on Nov. 29, 2011 in the name of Dvdperplay SA.
Alexa website retrieved from http://www.alexa.com/siteinfo/michaeljackson.com, on May 22, 2013.
Article Checker website retrieved from http://www.articlechecker.com/, retrieved on May 22, 2013.
"Notice from the European Patent Office dated Oct. 1, 2007 concerning business methods" Official Journal of the European Patent Office, vol. 30, No. 11. Nov. 1, 2007.
Written Opinion mailed on Dec. 30, 2011 for PCT/EP2011/071324 filed on Nov. 29, 2011 in the name of Dvdperplay SA.
"Fifth Delos Workshop: Filtering and Collaborative Filtering" European Research Consortium for Informatics and Mathematics. Budapest. Nov. 10-12, 1997. 123 pages.

* cited by examiner

METHOD AND COLLABORATION SYSTEM

CROSS REFERENCE TO RELATED APPLICATIONS

The present application is the US national stage of European Patent Application PCT/EP2011/071324 filed on Nov. 29, 2011 which, in turn, claims priority to U.S. Patent Application 61/417,782 filed on Nov. 29, 2010.

FIELD OF THE INVENTION

The field of this invention is that of collaboration platforms

More precisely, the invention relates to a method for valuating a contribution to at least one collective work.

BACKGROUND OF THE INVENTION

Collaboration platforms (or Online collaboration systems) are virtual workspace for facilitating and optimizing communication between individuals in order to develop common works. The most widely known are Wikipedia, Wikinews, Mechanical Turk or Second Life (in its virtual object creation function), but these collaboration platforms are used increasingly for open innovation, collective invention, participative innovation, concept management, and so on. The general term collaboration platform will be used to refer to "source management software" such as Subversion or Visual SourceSafe for collective software development.

The previously mentioned "work" is to be defined as an organized assembly of specific data (i.e. coherent set of digital data of the same type (text, hypertext source or reference link, 2D or 3D image—still or animated, photography, video, computer file, computer object or online service, etc.) provided in the development of the work). It may be understood as for example article, journal, encyclopedia, idea, summary, film, event, call for tenders, feasibility study, patent, market study, business plan, development plan, consultation report, demonstrator, prototype, technical test report, prospective panel test report, etc. A work can consist of a number of steps (ideation, design, feasibility, prototyping, etc.) and a number of phases (draft, development, finishing, etc.). A work therefore is not necessarily completed, in particular when it is in the planning or development stage.

A work is the result of one or more contributions. For an author, this is contributing action, participating, helping in the production of a common work: it may be addition, deletion or modification of specific data, spelling corrections, votes or other clicks, commentary, expression of an idea, thought or service, question or response, participation in a forum, recommendation, modification of a computer program, parameterization of an administrative tool, etc.

The work is said to be collaborative when the creation involves a number of natural people, composite when a new work is incorporated with a preexisting work without the collaboration of the author of the latter, or collective when it is created on the initiative of a natural or legal person who edits, publishes and discloses it under his or her direction and name and in which the personal contribution of the various authors participating in its production are combined in the overall work for which it was developed, without it being possible to attribute to each author a separate right for the whole work produced.

To sustain development, collaboration platforms on the Internet aim at prompting the largest number of contributors (call for contribution).

That is why collaboration plateforms enable remote people to provide specific data either for free, or in exchange for compensation, i.e. remuneration provided in various forms, tangible (see after) or purely non-tangible (for example reinforcing a reputation, public recognition, renown, rating, feature, co-ownership share, user license, etc.), and so on.

The reputation, which is a common idea of the skills, talent or reliability of a social entity (individual, group or company, etc.), is particularly important in social networks (set of social entities such as individuals or social organizations connected to one another according to their belonging or social relationships: Facebook, LinkedIn, Viadeo, etc.).

If tangible, different types of compensation are known. For each type, a plurality of examples is presented:
Financial compensation
Mechanical Turk: tagging, choice of best photo, description of a product, etc.
Tutplus, GoMediaZine, Tutorial9, eHow: tutorial writing
SurveyClub, ExpressPaidSurveys: consumer tests
LegalForce: online legal advice
Squidoo, HubPages, Google Knol: opinion articles
Second Life: virtual objects
OpenAd: call for advertising ideas
Innocentive: call for ideas for product lines, viral marketing, technical solutions, etc.
OneBillionMinds: call for technical or economic solutions for social innovations
FellowForce: call for technological concepts
Electronic money
Second Life: virtual objects (linden dollars)
Wikipedia: encyclopedia (wikimoney)
Gifts
Spigit: participative innovation (rewards)
Visibility or feature
Amazon: book reviews
eBay: online curiosities dealership Whatever the type of compensation, a major problem is how to define it, i.e. how to value what a contribution whose counterpart is the compensation represents in regard to its assessment in the commoditization of a work or a set of works. This is called the exchange value.

In many cases, the exchange value is defined before the service, on the basis of specifications or a fixed schedule. The US patent application US2009/086235 thus describes a way of how to define compensation on the basis of the contribution request, the user profile (gold/silver/bronze), characteristics of specific data (high-priority, low-quality), contribution media (email, remote data submission) and the specific data (description of one's neighborhood, photo, etc.) itself.

In other cases, this exchange value is defined when the service is delivered on the basis, for example, of:
the number of advertisements selected (clicked) by users
The international application WO2010/053922 describes how to associate advertisements with articles, and compensate authors according to the number of clicks on these advertisements.
a content quality rating
The US patent application US2003/014311 describes compensation to the author for a contribution based on the average ratings given by readers as well as the number of single accesses to said contribution by said readers.

The international application WO2010/053922 describes a classifier module enabling an article quality score to be defined, on the basis of:
the conformity of the page design with a template
the number of concepts in a page, evaluated according to a predetermined concept library
the number of working links
the number of misspelled words
the average weight of previous scores or the change of same
the technical evaluation of the first response to a contest: OpenAd, Innocentive, OneBillionMinds, FellowForce The US patent application US2009/299760 thus describes a computer system enabling, if the solution is accepted, compensation to the researcher, to be paid after transfer of intellectual property rights relating to this solution.
reviews by a network of Internet users The US patent application US2009/199104 thus describes an idea merit indicator, based on the number of users having provided comments and reviews and the reputation of these users. This reputation is itself calculated on the basis of the number of contributions of a user, the number of comments and reviews received or transmitted, its performance on the prediction markets (Online marketplace organizing bets relating to a proposal, for example: "Will the next president of the United States be Republican?" or sporting event results. These bets are generally subject to ratings), and so on. This idea of merit indicator results in compensation to the author, for example in the form of batches or credits.

Similarly, the US patent application US2009/271481 describes a computer tool so that ideas are rated by Internet users in order to make the best ones visible to manufacturers or investors.

The AMAZON website describes reviews using the well known question "was this comment useful?", which will then make it possible to valuate the best comment authors.

The EBAY website implements a contributor (vendor) rating system based on the number of positive comments: The rating can be composite, i.e. the contributor is rated according to a plurality of criteria, in this case: object conforming to the description, communication, delivery time, shipping fees, etc.

The international application WO2009/076555 proposes compensation indexed on a reputation score defined primarily on the basis of reviews, but also on the renown of the author, the number of publications by the author, the novelty of these publications, plagiarism, the amount of time the author has been registered and the number of links to the content.

However, in all of the cases mentioned, the exchange value is associated with a contribution for which it is possible to attribute a separate right. However, the arrangement of contributions for a work produced by means of a collaboration platform may become too complex to establish this distinction of rights in an operational manner.

This technical problem is regularly raised in a legal controversy relating to the notion of collective work. The French Intellectual Property Code characterizes it in particular when "the personal contribution of the various authors participating in its production are combined in the overall work for which it was developed, without it being possible to attribute to each author a separate right for the whole work produced. The impossibility of attribution mentioned in this text is technical (feasibility, operation or economic character). Historically, the legislator introduced this notion for dictionaries and encyclopedias. Today, it is conventionally used for multimedia works, collective works (advertising clip, bijou) or even on the basis of data (SIRENE directory). However, it presents problems of application and legal contradictions (see GAUDRAT and MASSE report, 2000; see http://www.droitsdauteur.culture.gouv.fr/gaudrat.pdf and DE BROGLIE report, 2000; see http://www.droitsdauteur.culture.gouv.fr/rapportbroglie.pdf).

To make it easier to understand this problem, we will use the example of Wikipedia. This is the largest free global encyclopedia, produced by the contributions of some hundreds of thousands of volunteer Internet users. Each contributor can provide his or her personal touch to any article. To encourage contributions to Wikipedia, some contributors have implemented electronic money, Wikimoney, making their compensation possible. The principle is as follows: each contributor having produced more than 200 edits receives an initial amount of 20 units. This money can be offered to other contributors in order to encourage them to contribute. The transfer from account to account is performed by editing the "Wikibank" page. This system has fallen into disuse due to its operational complexity.

Google Knol is a competitor of Wikipedia, but provides financial compensation to authors. It is possible for an author to authorize other contributors to modify his or her text ("open collaboration model"). However, Google Knol does not manage the sharing of compensation between the different contributors, as explained in the terms of service: "4.2 The initial author of a knol, i.e. the person at the origin of the creation of said knol, is, by default, the "Owner" thereof [ . . . ] 4.3 All of the distributions and all of the payments resulting from the AdSense monetization of a knol will be addressed to the Owner of said knol without taking into account any real or potential joint ownership of the copyright or any private contract signed between the members of the writing Team." Thus, Google Knol does not provide compensation for contributors in consideration of another type of operational complexity.

Therefore, there is a need for a new method for determining the right compensation for each contribution to a collective work produced by means of a collaboration platform.

SUMMARY OF THE INVENTION

According to a first aspect, the present invention provides a method for valuating at least one contribution to a collective work, each contribution being performed by a contributor connected to a collaboration platform via a network, the method comprising steps of:
defining a list of at least one usefulness indicators among a set of usefulness indicators stored on storage means the collaboration platform, each usefulness indicator being a measurable quantity that quantifies the usefulness of a contribution;
collecting the usefulness indicators of the list for each contribution to the work;
calculating by processing means of the collaboration platform a usefulness value for each contribution to the work according to the usefulness indicators collected for the contribution;
associating with each contribution to the work a compensation according to the usefulness value of the contribution.

Preferred but non limiting features of the present invention are as follow:

each usefulness indicator is relating to a feature of the contribution, specific data of the contribution, the work, or the contributor of the contribution;

the step of defining the list is performed through a parameterization interface by selecting or not each usefulness indicator of the set;

the step of calculating a usefulness value for each contribution takes into account only a sublist of the list of the usefulness indicators which are collected, the sublist being defined according to a vote by the contributors;

the compensation associated with a contribution is a function of a standardized usefulness value, the standardized usefulness value being the usefulness value of said contribution divided by the total sum of the usefulness values of the contributions to the work;

a global compensation for the work is valuated, each compensation being a part of the global compensation proportionally to the standardized usefulness value associated with the contribution;

the step of defining a list of at least one usefulness indicators among a set of usefulness indicators further comprises defining a list of at least one valuation parameter, the step calculating a usefulness value being performed according to the valuation parameters defined in the list;

the usefulness indicators are collected periodically and/or each time a contribution is performed;

the method comprises a further step of displaying usefulness values by work, contribution and/or contributor.

The present invention further provides according to a second aspect a collaboration system for enabling a plurality of contributors connected to a collaboration platform via a network to achieve at least one collective work by performing at least one contribution, characterized in that the collaboration platform comprises modules implementing a method for valuating the at least one contribution to the collective work according to the first aspect of the invention.

Preferred but non limiting features of the present invention are as follow:

the system comprises a personal interface enabling each contributor to perform contributions through the network after authentication;

the personal interface enables each contributor to define a skill profile;

the personal interface enables each contributor to display its contributions to the collaboration platform and/or its compensations.

BRIEF DESCRIPTION OF THE DRAWINGS

The above and other objects, features and advantages of this invention will be apparent in the following detailed description of an illustrative embodiment thereof, with is to be read in connection with the accompanying drawings wherein.

DETAILED DESCRIPTION OF A PREFERRED EMBODIMENT

Glossary

Usefulness value: What a contribution represents in regard to the advantage thereof, with respect to other contributions, in the development of the work(s) in which it is involved.

The usefulness value can be measured in different ways:
 by classifier: is this contribution more or less useful than another?
 by points: result of a rating.
 by percentage: result of the 100% usefulness distribution among a number of contributions.
 in currency: result, for example, of the distribution of a financial valuation of the work, or a financial estimate of the future exchange value of the work on a pro rata basis of the contributions
 by any uniform quantity with a tangible or intangible counterpart: usage credits, gifts, co-ownership shares, discount, recognition, feature, etc.

Implicit rating: Result of analysis software that judges a contribution or a work by extracting criteria.

Parameterization interface: Control panel of the collaboration platform enabling indicators and valuation parameters to be adjusted, in particular coefficients, constants and functions of the algorithm.

Administrative interface: Control panel of the collaboration platform enabling the rights of contributors and users to be adjusted, and the display and administrative states to be formatted.

Personal interface: Control panel of the collaboration platform enabling each contributor to adjust the presentation of his or her profile, and the display of his or her contributions and other information concerning him or her.

Collaboration System

Figure 1:
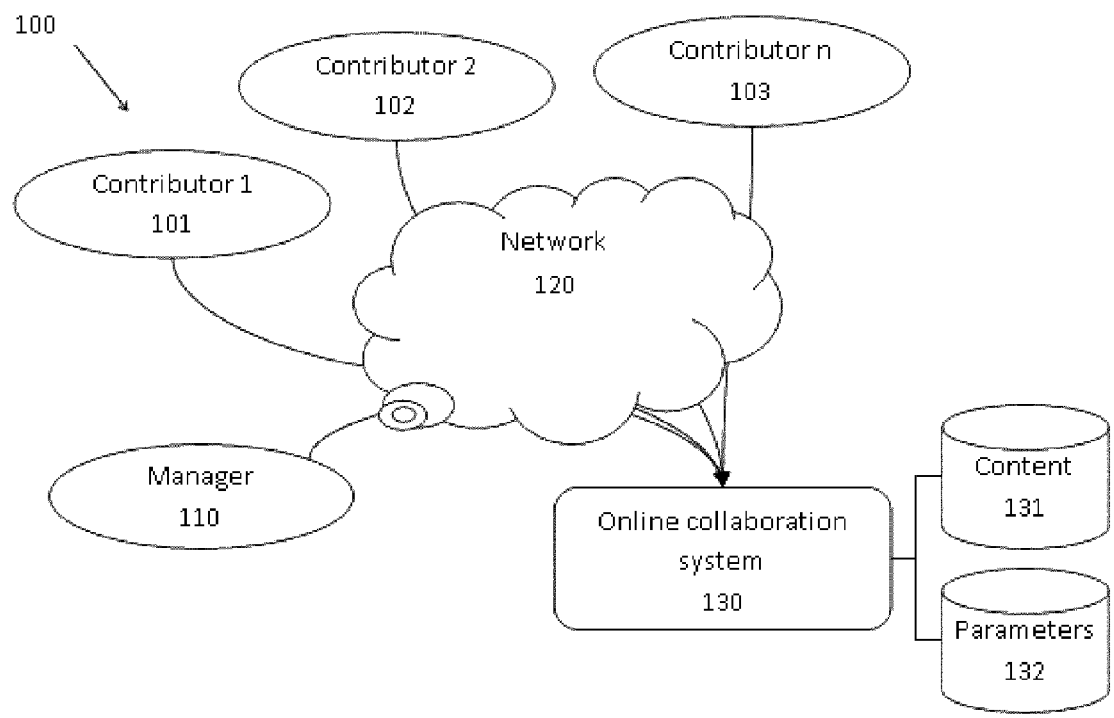
FIG. 1 is a diagrammatic representation of an example of a collaboration system that enables a plurality of contributors to create collective works.

Referring to FIG. 1, the invention proposes a collaboration system 100 in which a plurality of contributors 101-102-103 (which are typically using personal computers) connect via a communication network 120 such as the Internet to a collaboration platform (or Online collaboration system) 130, which is typically a server comprising processing means and storage means. The content 131 and the parameters 132 of this collaboration platform 130 are administered via the same network 120 by a manager 110 who will ensure, in addition to the classic administrative functions of any collaboration system, specific functions which will be described in the following figures and will thus have access to the parameterization 261 and administrative 262 interfaces.

Figure 2:
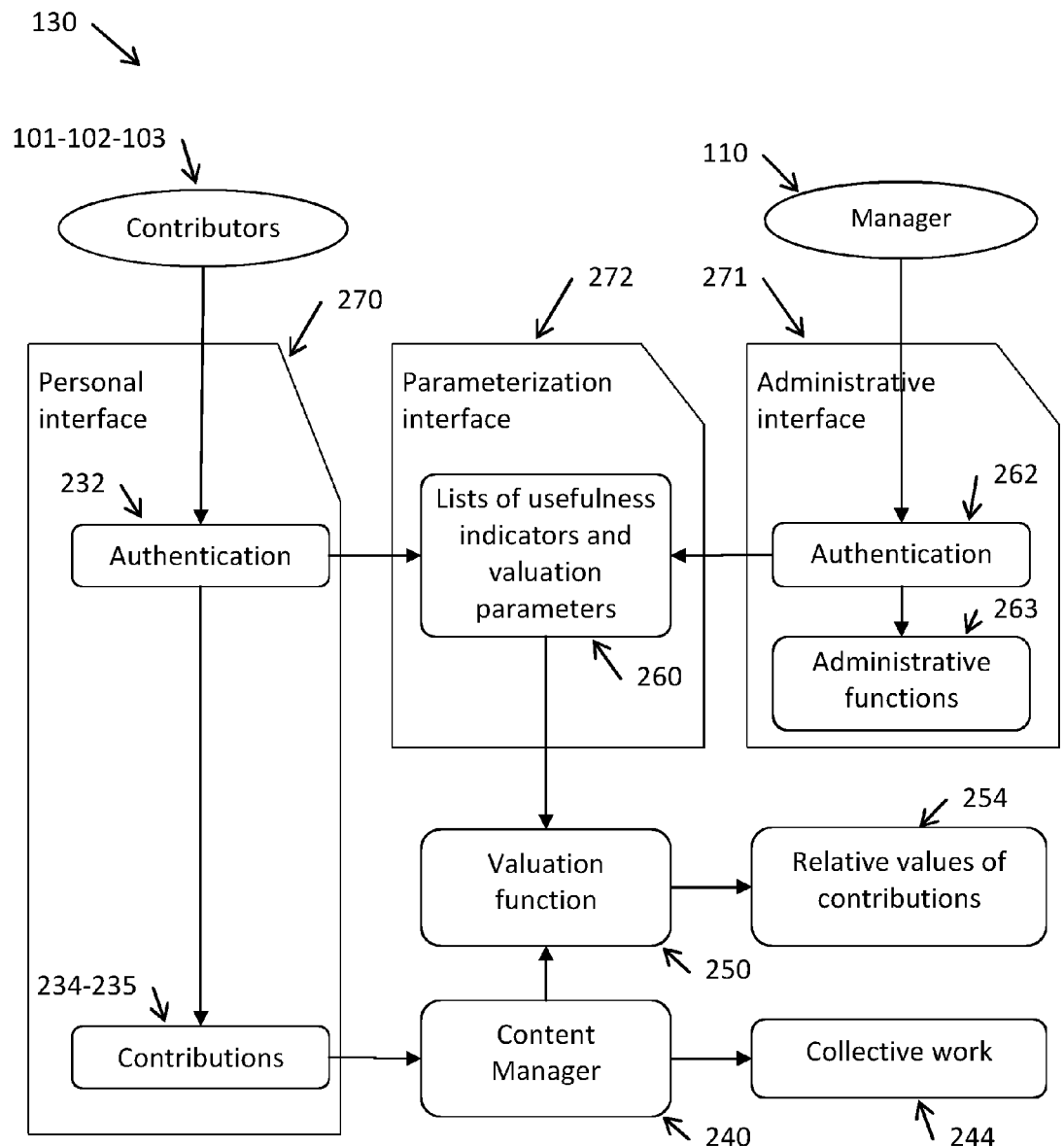
FIG. 2 is a conceptual diagram of a collaboration management system to which the contribution valuation functions of the invention have been added.

Referring to FIG. 2, the collaboration platform 130 proposed by the invention offers a content management function (Content manager) 240 making it possible to develop, manage and display collective works 244 developed by assembling contributions 234-235 by a plurality of contributors 101-102-103 who access the collaboration platform 130 via a personal interface 270 in which they are duly authenticated by an authentication function 232. A manager 110 administers the collaboration platform 130 via an administrative interface 271, which enables him or her to access the administrative functions 263 after being duly authenticated by an authentication function 262. The invention defines a method 250 for valuing contributions using series of valuation indicators and parameters 260 defined by the parameterization interface 272 by the manager 110 and collectively by the contributors 101-102-103. The values of the contributions 254 calculated by the valuation system 250 can be used to compensate the contributors 101-102-103.

Figure 3:
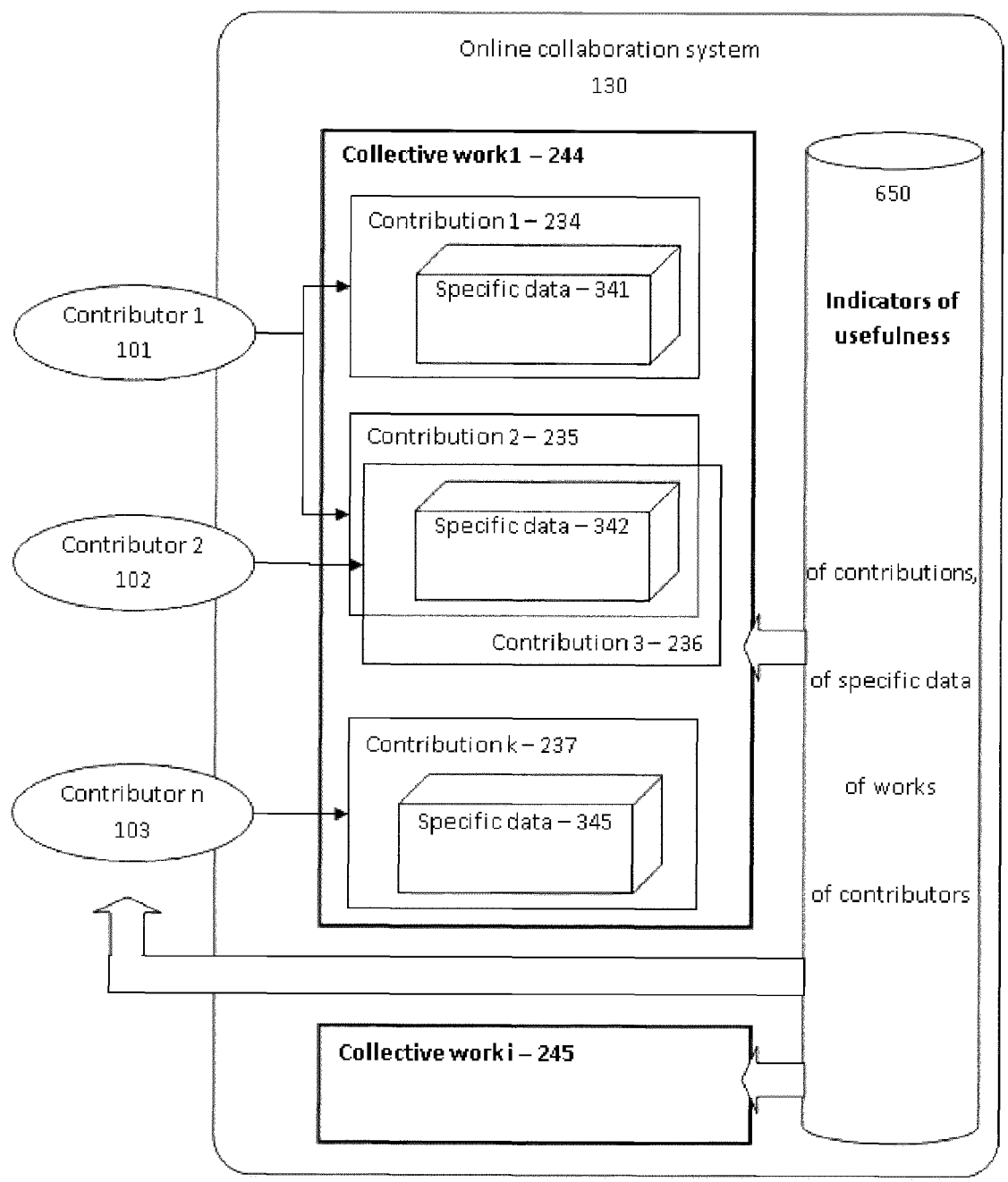
FIG. 3 is a is a conceptual diagram of a collaboration management system enabling the development of collective works developed by a series of contributions, each capable of providing specific data.

FIG. 3 shows an example of a plurality of collective works 244-245 resulting from a plurality of contributions 234-235-236-237 entered on the screen or downloaded on the collaboration platform 130, by a plurality of contributors 101-102-103.

The contribution valuation method proposed by the invention and implemented in the valuation function 250 is based on the collection, development, calculation and storage of usefulness indicators 650 relating to the contributions 234-235-237 and the specific data 341-342-345 that they provide to the work, the collective works 244-245 themselves and the contributors 101-102-103. The term "indicators" used alone will generally mean all of these usefulness indicators. The term "collection" will refer to all operations of data and value collection, development and calculation of said usefulness indicators.

Figure 4:
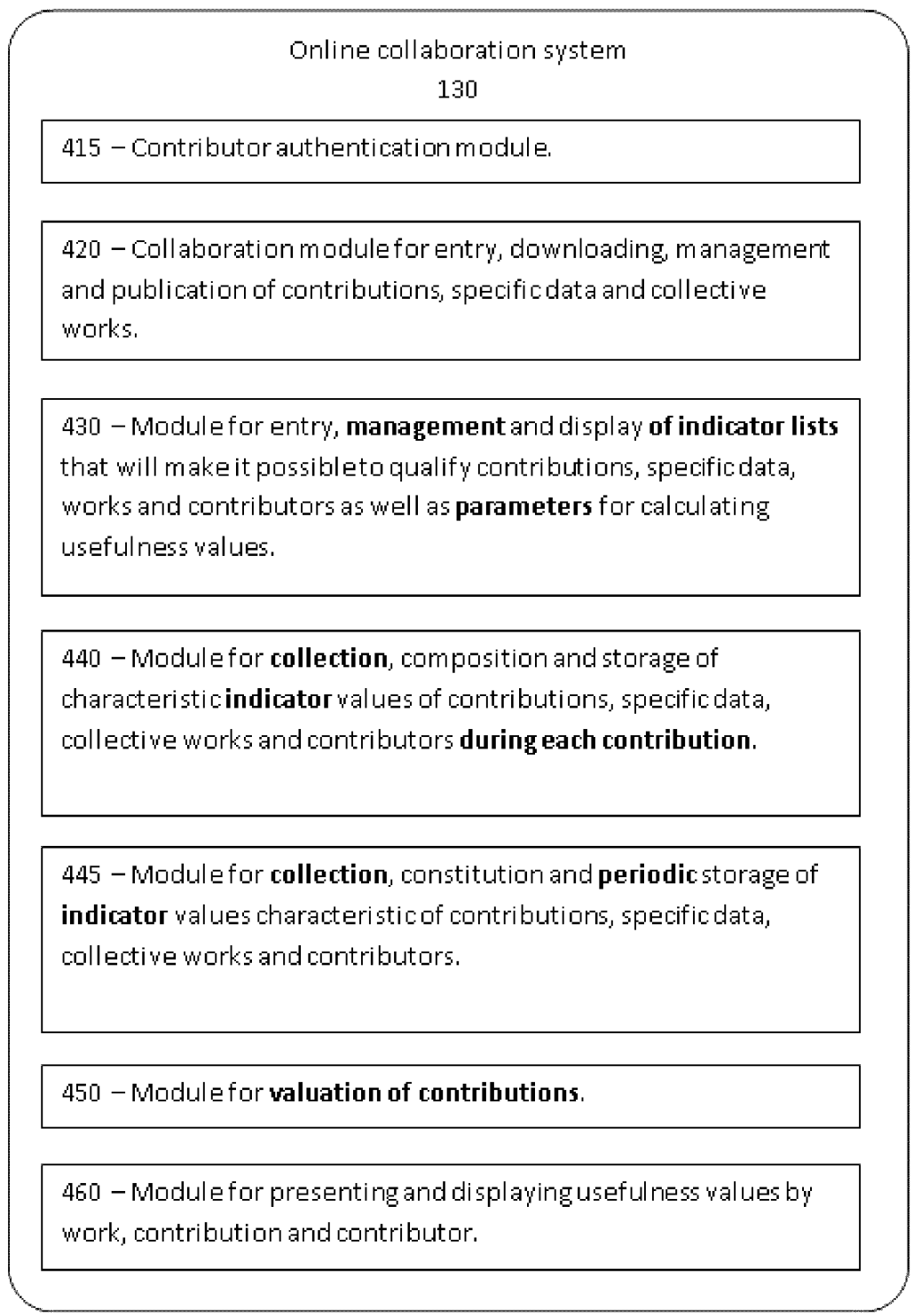
FIG. 4 is a diagram of modules that constitute a collaboration management system to which the contribution valuation functions of the invention have been added.

Referring to FIG. 4, the collaboration platform 130 comprises a module 415 for authentication of contributors, then a module 420 for entry and/or downloading of contributions and specific data, development of works, management and display of said works, and contributions and specific data. An entry, management and display module 430 enables a manager 110 and the contributors 101-102-103 themselves to define and display the lists of usefulness indicators and the valuation parameters 260 that will enable the module 450 to calculate the usefulness value of the contributions in the overall value of the work. A module 440 collects, before and after each contribution, the usefulness indicators that characterize the contributions, the specific data, the work developed or being developed and the contributors. Another module 445 collects these same usefulness indicators periodically over time until the end of the lifetime of the work. These usefulness indicator collection modules 440 and 445 thus store the history of the values of these indicators before and after each contribution, then at regular intervals over time. The module 460 enables the presentation and display of the usefulness values by work, contribution and contributor.

Figure 5:
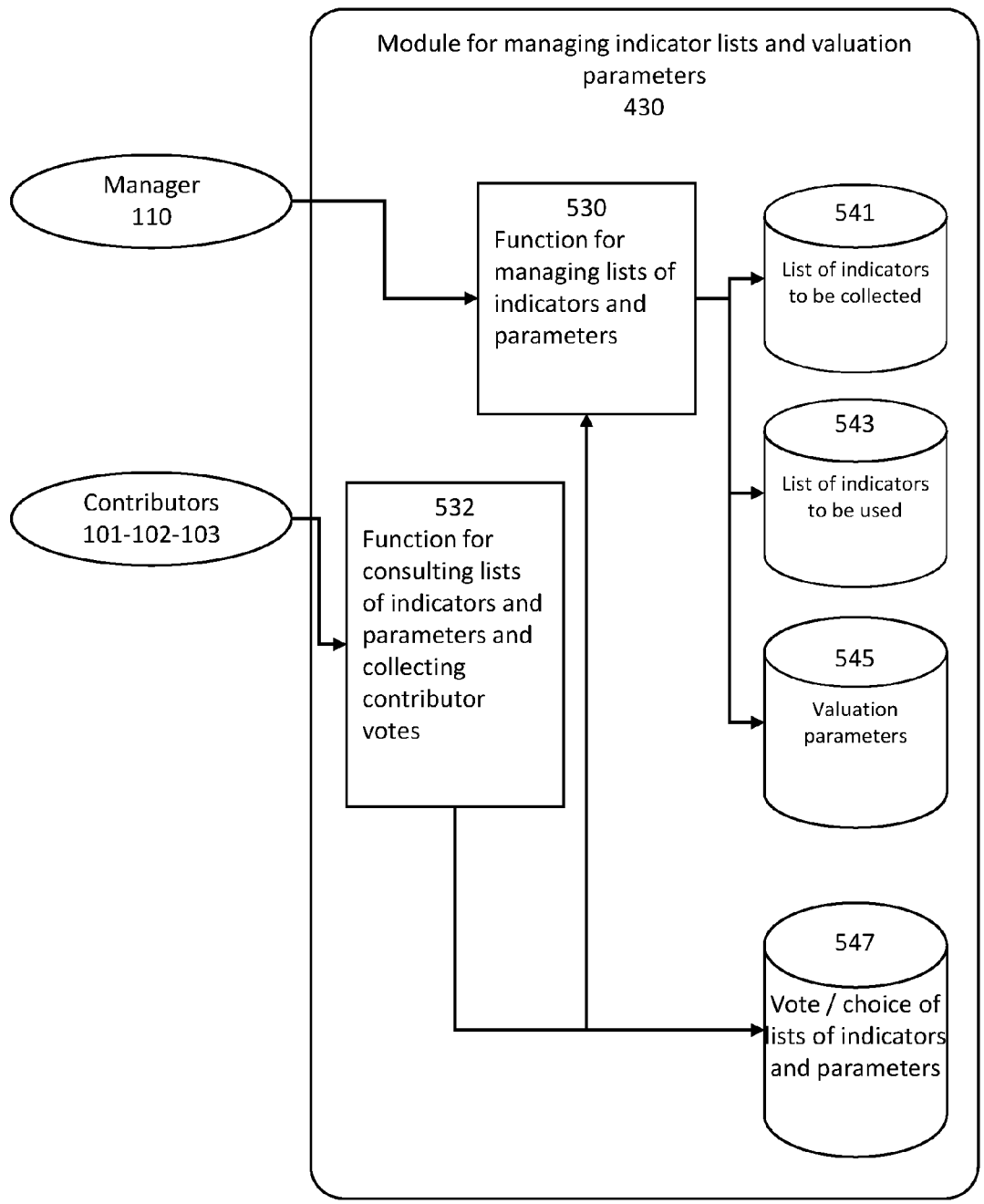
FIG. 5 is a diagram of the module for managing lists of contribution valuation indicators and parameters according to the method of the invention.

As represented by the FIG. 5, the collaboration platform comprises a module 430 for managing lists of indicators and valuation parameters 260 offering a function 530 that enables the manager 110 to define a first list of indicators 541 that will be collected by the system. He or she chooses from this list 541 the list 543 of those that will actually be used for the valuation. He or she also defines the valuation parameters 545. These valuation parameters are a set of numeric constants, mathematical functions and algorithms that will be implemented in the valuation module. The manager 110 can also implement the function 532 that enables the contributors 101-102-103 to consult the list of usefulness indicators 543 and valuation parameters 545 and to participate in the choice thereof by votes that are recorded in a database 547. The manager 110 validates these votes, which modify the lists 543 and 545.

Figure 6:
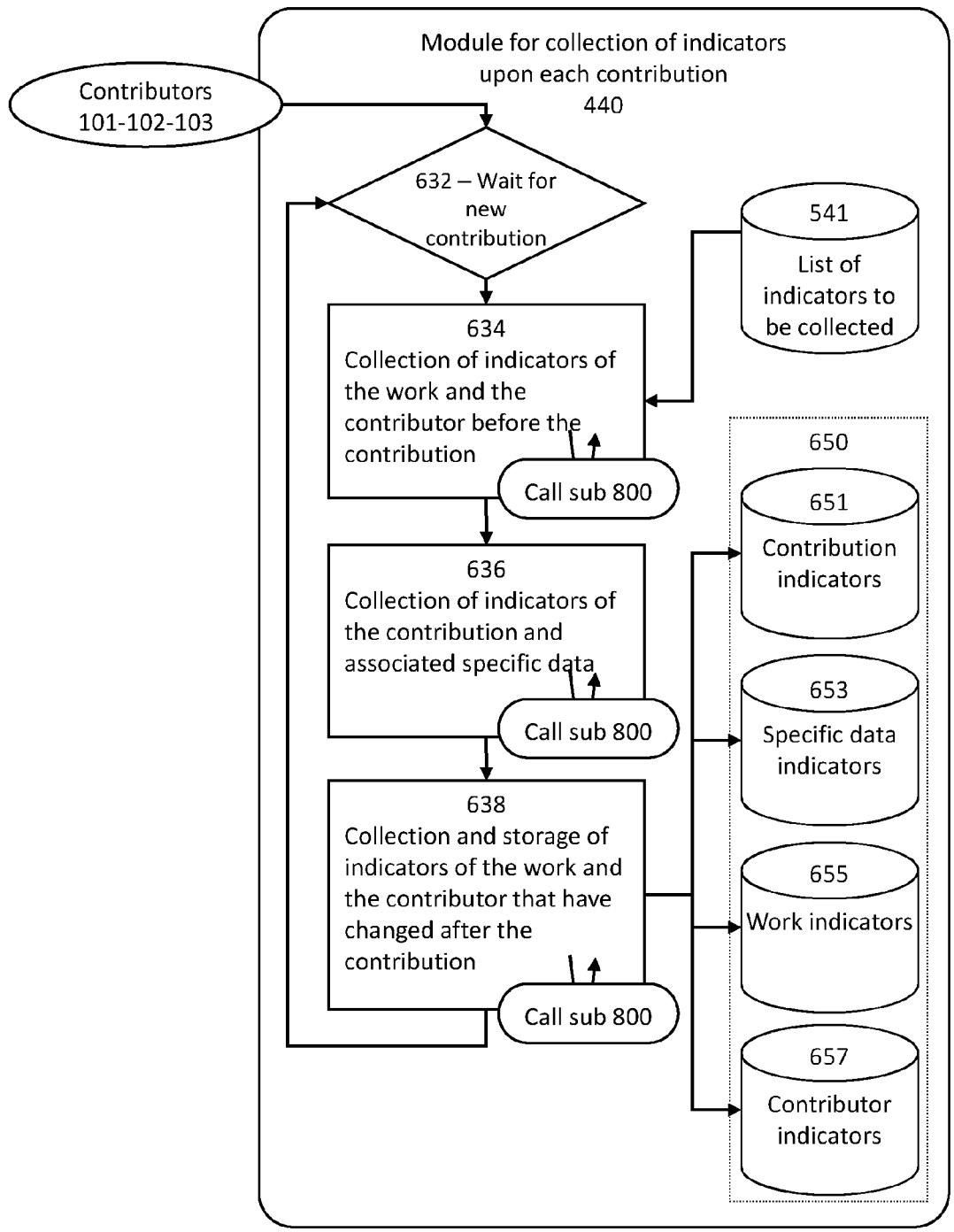
FIG. 6 is a diagram (flow chart) of the valuation indicator collection function at the start of a new contribution.
Figure 8:
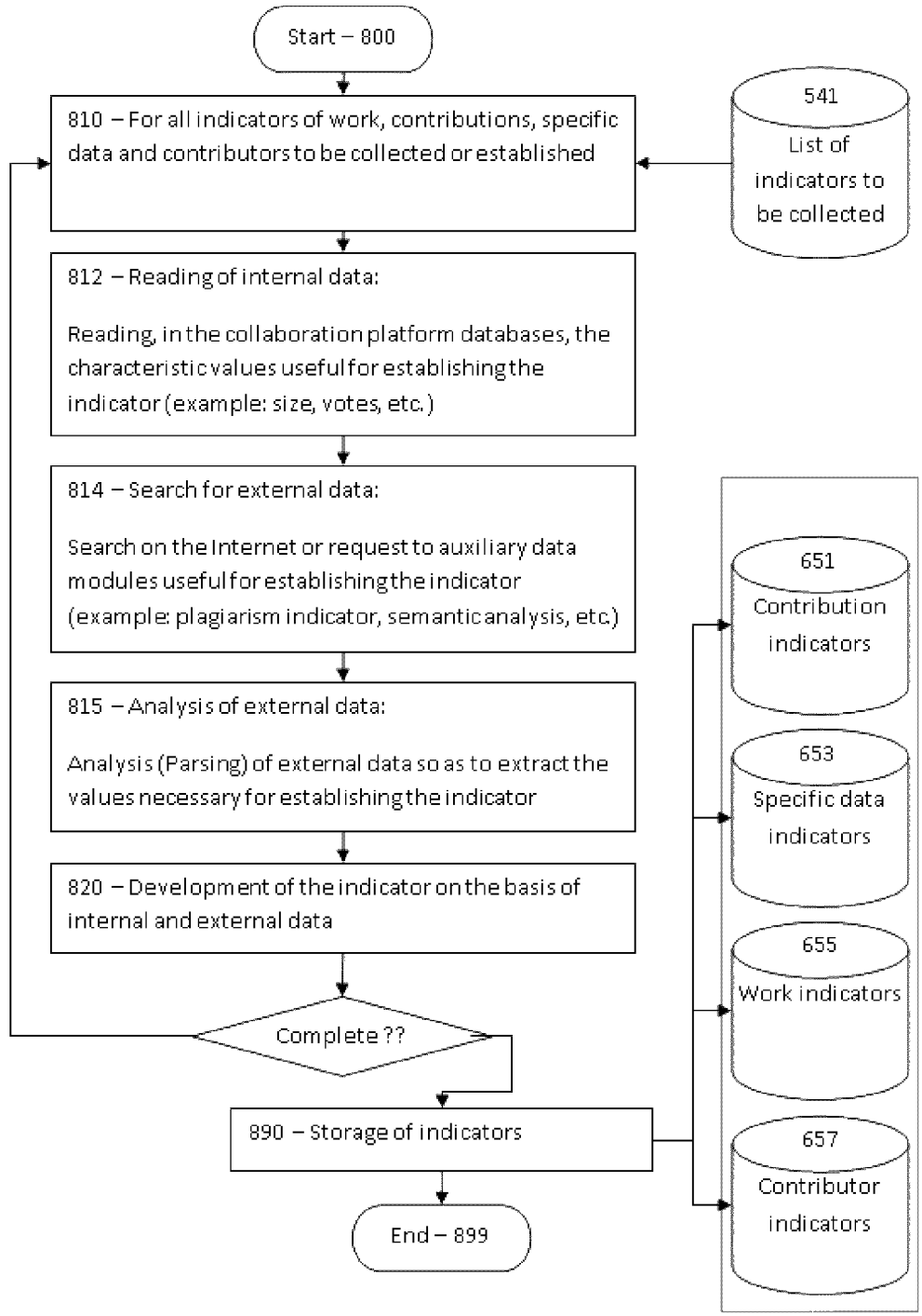
FIG. 8 is a partial diagram (flow chart) of elements common to the valuation indicator collection functions presented in FIGS. 6 and 7.

Referring to FIG. 6, the collaboration platform also comprises a module for collecting and advantageously displaying indicators during each contribution 440 of which the main function is automatically activated at the start of a new contribution. This function is automatically activated at the start of a new contribution. This function reads the list 541 of indicators to be collected, collects the indicators relating to the work and to the new contributor before taking the contribution into account (step 634), collects the indicators that characterize the new contribution and the specific data associated with it (step 636), again collects the indicators that characterize the work and the contributor after integration of the new contribution (step 638). It stores all of the indicator values collected during these steps in tables 651-653-655-657 of the database 650. In each step, it uses a sub-function 800 of which the operation is presented in detail in FIG. 8. At the end of the processing, it waits for the start of a new contribution (step 632).

Figure 7:
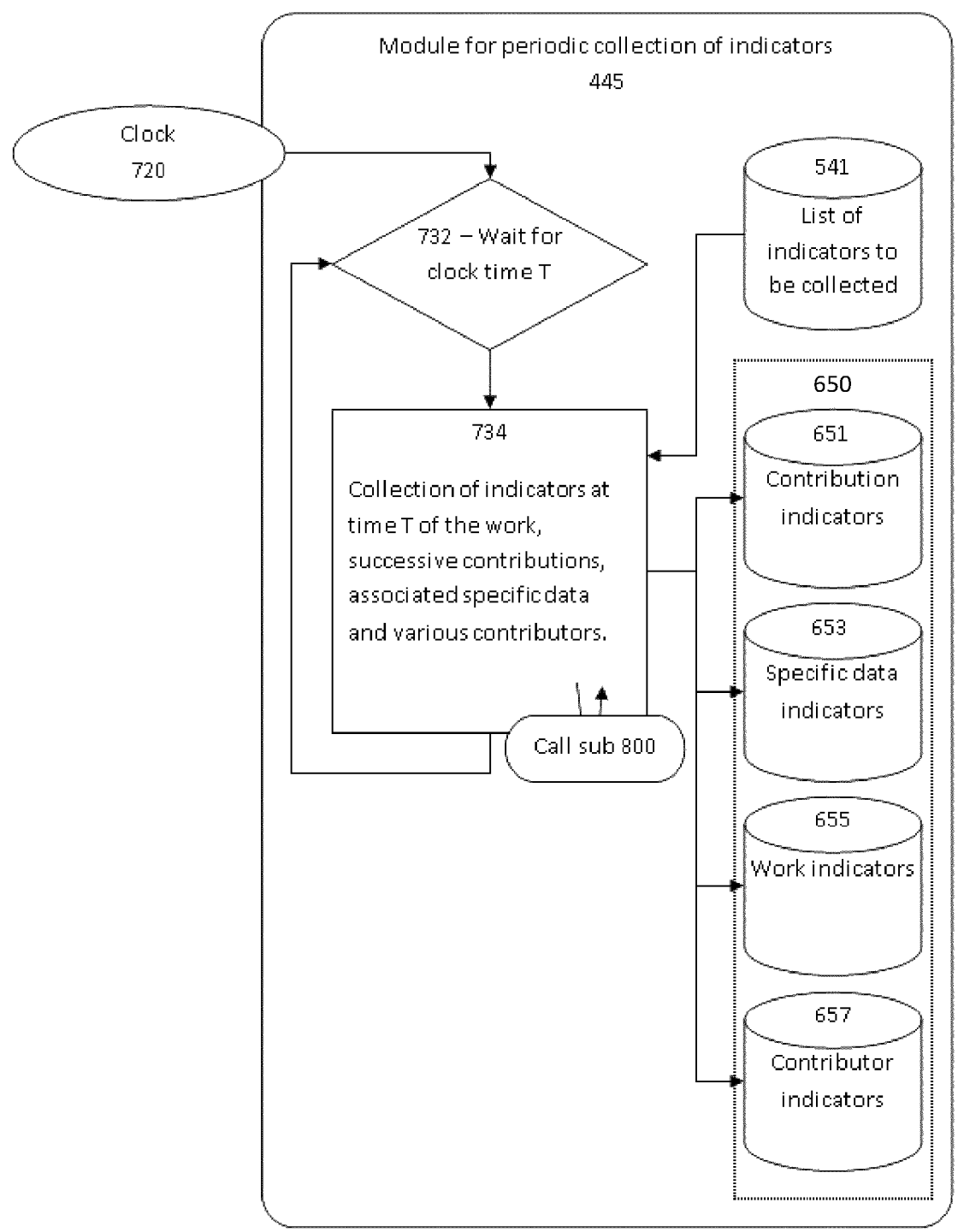
FIG. 7 is a diagram (flow chart) of the valuation indicator collection function activated periodically by a clock.

As represented by FIG. 7, the collaboration platform advantageously comprises a module for periodically collecting indicators 445 of which the main function 734 is automatically and periodically activated by a clock 720. This function 734 reads the list 541 of indicators to be collected, collects the indicators relating to the work, to the contributions that have comprised it, to the associated specific data and to the different contributors at time T of the activation of this clock, and stores them in tables 651-653-655-657 of the database 650. It uses a sub-function 800 of which the operation is presented in detail in FIG. 8. At the end of the processing, it waits for the clock (step 732).

The sub-function 800 is called upon by all of the indicator collection functions. This sub-function reads, in the database 541, the list of indicators to be collected (step 810). For each indicator, it first searches the local database of the collaboration platform for all of the characteristics useful for establishing the indicator (step 812). It then carries out, on the Internet or on auxiliary systems, (for example, semantic analysis engine), requests stored in the database 541 (step 814) and stores the responses returned. The data returned in step 814 is analyzed so as to extract the characteristic values useful for the development of the indicator (for example, the amount of similarity between two contributions, compared semantic content, etc.) (step 815). The useful data is gathered, and the function determines the value of the indicator (step 820). The indicators thus developed are stored in tables 651-653-655-657 of the database 650 (step 890).

Figure 9:
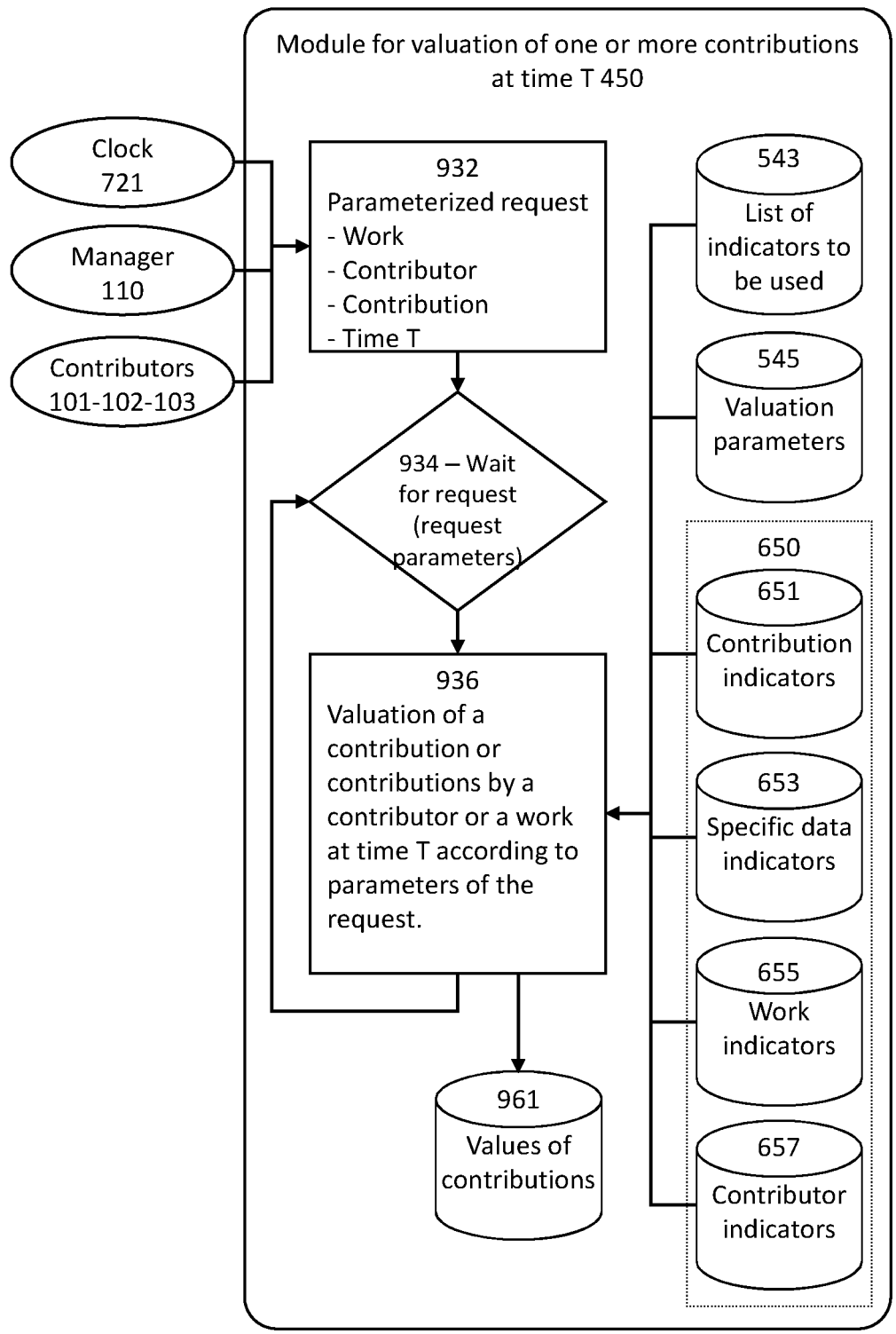
FIG. 9 is a diagram (flow chart) of the function for consulting the value of one or more contributions for one or more works, and the function for commenting and voting in return T.

Referring to FIG. 9, the collaboration platform comprises a module for valuation of the contributions of a single contributor. The valuation is activated upon request 932, i.e. an automatic request from a new clock 721 or a manual request from the manager 110 or a contributor 101-102 or 103. This request is characterized by one or more request parameters: the identifier of a work, the identifier of a contributor, the identifier of a contribution and the indication of a time T (date and time). The valuation function 936 reads the list 543 of indicators that must be taken into account in the valuation, reads the database 545 of valuation parameters (which stores the numeric constants, mathematical functions and algorithms to be used for this valuation), then the last values known at time T of the indicators concerned as they have been stored in tables 651-653-655-657 of the database 650. It calculates this valuation and records the result in the database 961 for display and subsequent use, and then waits for a request (step 934).

Figure 10:
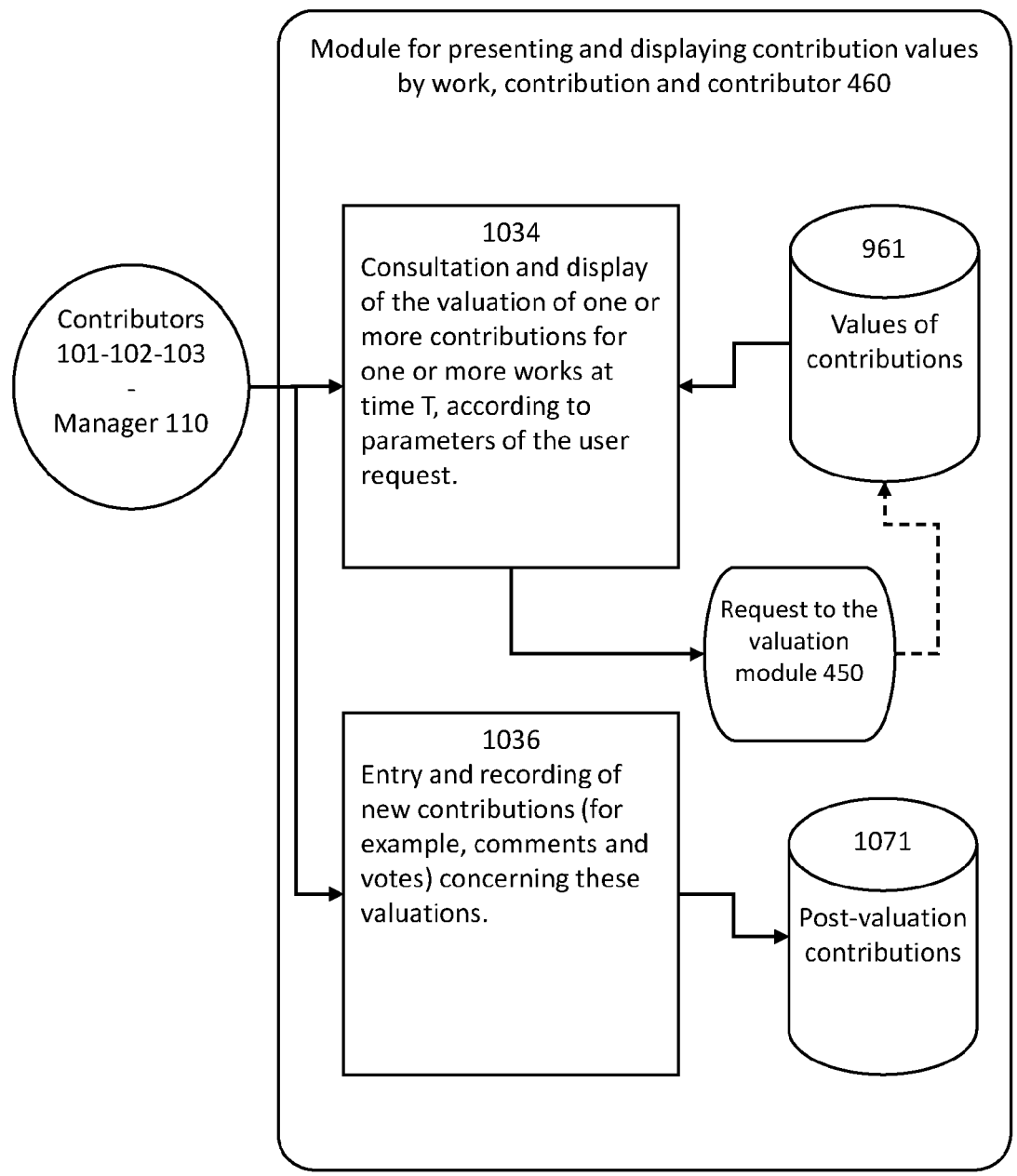
FIG. 10 is a diagram (flow chart) of the function for consulting the value of one or more contributions for one or more works, and the function for commenting and voting in return.

The module 460 represented by FIG. 10 offers users (contributors 101-102-103 and manager 110) a function 1034 for consultation of usefulness values of contributions according to different filters (by contribution, by contributor, by date, etc.) at a time T, which is by default the current time. This module reads these values in the database 1061. If it does not find them, it can activate a request that will be submitted to the valuation module 450, which will return the value missing from the database 1061. If the manager 110 authorizes it, the function 1036 enables contributors to make new contributions (for example, to provide comments and to vote) with regard to a given valuation. These new contributions are recorded in a database 1071. After validation by the manager, these records can comprise new indicators for qualifying the contributions and contributors concerned, or to adjust certain valuation parameters for subsequent calculations of these usefulness values, thus forming a feedback function.

Calculation of a Usefulness Value and its Associated Compensation

Referring to the drawings previously descried, the invention proposes as already explained a method for operationally establishing the compensation of each contributor of a work, in particular a collective work. In the context of the present invention, we may thus consider it is not possible to attribute a separate right to each contributor, unless according to the invention.

This method defines the usefulness value of each contribution to a work, calculated by an algorithm on the basis of a set of usefulness indicators and the variation thereof. These usefulness indicators are collected at times specified by the method.

A usefulness indicator is a quantity that can be measured directly or indirectly by analyzing contributions, specific data or works, the profile of contributors or any other service environment element.

A list of possible usefulness indicators is now detailed. Those in bold will be more specifically presented in the following description.

Indicators Relating to Contributions
TYB—Type of contribution
Drafting, modification, spelling correction, addition of a chapter, addition of references, addition of an illustration, rewording, simplification of the expression, formatting, layout, standardization, meta information, aggregation, organization, transclusion, programming, debugging, drawing, assembly, collage, CPU or energy optimization, optimization of modularity or reusability, comment, review, suggestion, verification, annotation, underlining, evaluation, validation, rejection, recommendation, prompt, moderation, conflict resolution, administration, etc.
TEM—Time spent
The time that has passed between the login and logoff of the contributor, the time that has passed between the opening of an online text editor and the publication of the contribution.
NUC—Contribution number
Order number of the contribution: the first contribution to an article is often more useful than the tenth. In Wikipedia, this number can be derived from the list of contributions visible in the "history" tab of the article.
VAL—Stated value
Price of a contribution evaluated by its contributor, optionally validated by vote or by a manager: this price can be useful for differentiating an original illustration prepared offline from a copyright-free copied graphic.
DUR—Lifetime
Time during which the contribution has not been modified, or during which the meaning has not been altered.
In Wikipedia, the "view history" tab of an article shows all of the contributions that have developed said article. In the contribution k line, the date and time of publication are indicated; see: http://en.wikipedia.org/w/index.php?title=Help:Page history&action=history.
$DUR_k$ is thus measured by the difference between lines k+1 and k.
LIE—links from the contribution
Number of HTML links integrated in the contents of the contribution. In Wikipedia, the "view history" tab makes it possible to access the contributions. The "prey" link at the beginning of the contribution line k makes it possible to display the code added by this contribution k. In this code, the internal links are surrounded by tags <<et >>. The LIE can be established simply by counting these tags.
LIR—Links to the contribution
Number of HTML links or transclusions pointing to the contribution, number of additional contributions associated with the contribution (in a forum: length of a discussion thread).
NOC—RATING of comments
Average weight of ratings of each comment (a comment is itself a contribution).
NIS—Implicit rating of the contribution by semantic analysis
   use of meaningless expressions
   use of ambiguous or vague words
   strong similarity with previous contributions or with other previous content found on the Internet (plagiarism)
NIM—Implicit rating of the contribution by mouse movement analysis
   movement speed
   movement to an area of interest
   hesitation before click
NIH—Implicit rating of the contribution by analysis of hardware and electronic resources necessary for executing a code.
NIX—IMPLICIT rating of the contribution by actions
   number of duplications
   number of integrations in a plurality of works
   number of sharings of the contribution in a plurality of works
ACC—Acceptance/Rejection of the contribution
Rejection of the entire contribution by a subsequent contribution.
In Wikipedia, the "history" tab of an article makes it possible to access an "undo" link accessible at the end of the line of a contribution k. In the modification page that opens up, the "summary" field is then filled in by default with the indication "cancel version x", which will then appear in the corresponding contribution line of the "history" tab. This indication makes it possible to find the rejected contributions and thus establish the $ACC_k$ indicator.
ACH—Completion of the contribution
Completion of peripheral information of a contribution: flags, meta-information, summary, title, classification, links, referencing, etc.

SOU—Number of sources

Number of HTML links referenced in the list of sources of the contribution.

In Wikipedia, the "modify" tab of an article makes it possible to find the sources that are surrounded by the tags <ref> and </ref>. The SOU indicator is established simply by counting these tags.

PRC—Profile of the contribution

Keywords, activity sector, type of science, lexical corpus, recipient.

Indicators Relating to Specific Data

TYC—Type of specific data added

Text, illustration, animation, video, computer file, computer program, 3D object.

QCA—Amount of specific data added

Number of characters of the contribution, number of illustrations, size of the illustration in bytes, number of primary 3D objects integrated, size of the program code added.

In Wikipedia, the "view history" tab of an article shows all of the contributions that have developed said article. The contribution k line shows the number of bytes, which provides the QCAk value for direct reading; see: http://en.wikipedia.org/w/index.php?title=Help:Page history&action=history QCC—Amount of specific data of the contribution remaining intact in the most recent version of the work.

In Wikipedia, the "view history" tab of an article shows all of the contributions that have developed said article. The contribution k line shows two links "prey" and "cur", which make it possible to see the provisions of this contribution and its comparison with the most recent revision; see: http://en.wikipedia.org/w/index.php?title=Help:Page history&action=history QCC, expressed in number of words, characters or bytes can easily be deduced by comparison of these two entries.

QCR—Amount of specific data reworded

Amount of specific data of the contribution of which the meaning has remained intact in the specific data, estimated by a semantic analyzer.

QCE—Amount of specific data enriched

Amount of specific data of the contribution of which the meaning has remained intact, and to which other subsequent contributions have produced subdivisions.

It is possible to measure the number of relevant keywords shared between the specific data of a contribution and the final work. It is possible to improve the relevance of this measurement by semantic analysis, by comparing the topics extracted from the specific data of a contribution and those extracted from the final work. By a weighted sum of these lexical and semantic analysis indicators, a quality indicator QCEk is deduced.

For a simple lexical analysis, it is possible to use document search tools such as SearchManagers/IBM Stairs. It is possible to introduce a semantic analysis factor by using the IBM software "Omnifind Enterprise Edition" to which the Arisem module provides functions of automatic categorization, extraction of named entities, "Cross-language" searching and "intelligent" filtering. Similar offers are available from large companies (such as Business Object), but also as open source (Tattler).

NIP—Originality indicator

Dishonest contributors may copy data found elsewhere on the Internet. To locate this problem, numerous free software programs (http://plagiarism.phys.virginia.edu/Wsoftware.html, www.plagium.com, www.articlechecker.com, etc.) or commercial software programs make it possible to measure, on the Internet, the degree of plagiarism of specific data. Most of these software programs provide, in return, a plagiarism indicator expressed as a percentage between 0 and 100%, i.e. between 0 and 1, which can be used directly as an NIS indicator.

dNIP—Variation in the originality indicator after a new contribution

This indicator measures the variation in the originality indicator at the time of a new contribution n: $dNIP=NIP(n)-NIP(n-1)$ NIP'—Variation in the originality indicator over time (derivative)

This indicator measures the variation in the originality indicator over time: $NIP'(t)=(NIP(t)-NIP(t0))/(t-t0)$ Indicators Relating to Works ACT—Timeliness of a work Correspondence of a work with the timeliness of a subject: an article on terrorism will be more useful on the day of an attack, but this usefulness will be related to the timeliness and not to the most recent contribution coincidentally provided the day before.

ACT can be defined by comparing the keywords of a work with a tool for measuring associated topics in the media or on the Internet ("media monitoring", "web clipping"); see: http://www.alexa.com/siteinfo/michaeljackson.com, http://toolserver.org/~johang/wikitrends/french-uptrends-this-month.html CYC—Cyclicality of a work Correspondence of works with a cyclical topic of interest, for example, an article on Santa Claus.

NOX—Explicit ranking of the work
- Number of fans of the work
- Responses to an evaluation questionnaire
- Average ratings provided by other contributors, who judge the work by means of a rating interface, such as:
  - Thumbs up/thumbs down
  - Cursor formed by a line of stars
  - Cursor in the form of a measuring instrument
  - Field for entering a value This average can be weighted according to the reputation of a given contributor with respect to a given contribution. The rating can also be composite, i.e. it can have a plurality of dimensions, relating for example to a number of types of contribution (see "TYB" indicator above).

In YouTube, a check box placed below a video makes it possible, when it is passed over, to see the votes: "53 like, 23 do not like". This information enables the NOX to be calculated.

In Facebook, NOX can be defined by the number of fans (people having clicked on a "like it" button): http://statistics.allfacebook.com/pages/leaderboard/-/-/-/f/desc/-/0/
- Estimated valuation of the future exchange value of the work by using prediction market tools NOO—Implicit rating of the work
- Number of pages viewed
- Period of time that the work is viewed
- Number of clicks per page viewed
- Bounce rate
- Age, sex, education, ethnicity, income, nationality of users
- Positive comments after analysis by semantic tool
- Conformity of layout to a template
- Number of links, optionally operational, from this work
- Number of links to this work
- Diversity of opinions expressed
- Number of spelling errors
- Time that has passed since the last revision
- Progress
- Buying act after consultation of an article In Wikipedia, NOO can be defined on the basis of the number of pages viewed, by means of a statistical tool such as http://stats.grok.se/fr/201005/Bonapartisme.

In Wikipedia, NOO can be defined on the basis of the time since an article has been edited, or, by contrast, the update frequency. See: http://en.wikipedia.org/wiki/Wikipedia:DUSTY http://www.wikirage.com/top-edits/168/

More broadly, the activity rates and other statistics of Web pages are measured conventionally, for example: http://www.alexa.com/siteinfo/michaeljackson.com NMM—Indicator of user interest by analysis of mouse movements When tracked, the analysis of mouse movements makes it possible to measure the user's interest in the work that he or she is viewing.

See Mueller and Lockerd, MIT Medialab: http://citeseerx.ist.psu.edu/viewdoc/download?doi=10.1.1.120.3862&rep=rep1&type=pdf dACT, dCYC, dNOX, dNOO, dNMM—Variations in work indicators after a new contribution These indicators measure the variation in a work indicator at the time of a new contribution n, for example: dACT=ACT(n)−ACT(n−1)

ACT', CYC', NOX', NOO', NIM'—Variations in work indicators over time (derivative)

These indicators measure the variation in a work indicator over time, for example: ACT'(t)=(ACT(t)−ACT(t0))/(t−t0)

Indicators Relating to Contributors

REC—Recommendations

Number of people in the social network who recommend the contributor, optionally weighted by the reputation of these people.

In LinkedIn, the "recommendations" section of the profile of a person directly provides a REC.

RES—network

Number of people connected to the contributor, optionally weighted by the reputation of these people.

In LinkedIn, the "connections" section of the profile of a person directly provides the RES.

NCO—Number of contributions by the contributor

Number of Contributions made by the contributor.

NCM—number of comments

Number of comments written by a contributor.

In Amazon, the profile of a contributor shows this number NCM on the "comments" tab; see: http://www.amazon.fr/review/top-reviewers/ref=cm cr tr link1

AUT—Profile of the contributor

Biography, expertise, activity sector, type of science, type and level of education or training, seniority level, areas of interest, social networks, communities, contact information, renown, belonging or time of belonging to a community or an organization, type and number of publications, number of citations, prizes and contests won, etc.: explicit and implicit values.

In LinkedIn, the "advanced people search" function includes a "seniority level" section (manager, owner, partner, CXO . . . ); see: http://www.linkedin.com/search?trk=advsrch.

This section makes it possible to characterize the "seniority level" component of the AUT usefulness indicator. Other components can implicitly be deduced by a specialized software program that completes the "specialties" section of the profile.

In Wikipedia, users have different statuses, such as "autoconfirmed", "confirmed", "administrator", "active user", etc. Their list, which is visible, can be used to complete the AUT indicator; see: http://en.wikipedia.org/wiki/Special:Statistics In Google, the renown of a person can be measured on the basis of the number of Web pages found by the search engine on his or her surname.

PXR—relational proximity

Distance or weighted average of connection distances in the social network between the contributor and the users (see "subjective usefulness value"), In LinkedIn, the relational proximity of the user and another person is indicated in the profile of this other person next to his or her name. PXR can thus be deduced from this relational proximity.

PXI—Proximity of interests

Sharing or average sharing of areas of interest between the contributor and one or more users (see "subjective usefulness value").

In Facebook, the "info" tab of a person's profile includes an "interests" section. PXI can be deduced from keyword correspondences between the interests of two people.

In LinkedIn, a person's profile includes an "additional information" section, which includes an "interests" section. PXI can be deduced from keyword correspondences between the interests of two people.

PXV—Proximity of values

Sharing or average sharing of values between the contributor and one or more users (see "subjective usefulness value").

GAR—Service guarantee

Guarantee of debugging, proper program operation, originality of content.

RSE—Social and environmental responsibility

Agreement by the contributor to comply with the RSE standard in the production and use of his or her contributions.

CHA—Charter

Signature by the contributor of a special charter.

dREC, dRES—variations in contributor indicators after a new contribution

These indicators measure the variation in a contributor indicator when a new contribution n is made, for example: dREC=REC(n)−REC(n−1)

REC', RES', NCO', NCM', AUT', PXR', PXI', PXV', GAR', RSE', CHA'—Variations in contributor indicators over time (derivative)

These indicators measure the variation in a contributor indicator over time, for example: REC'(t)=(REC(t)−REC(t0))/(t−t0)

Collection of Indicators

The usefulness values of contributions are calculated on the basis of characteristic usefulness indicators of the contributions, specific data that they provide to the work and the work itself, or characteristics of the personality and reputation of the contributors. It is possible, in the determination of these usefulness values, to take into account the variation in these usefulness indicators over time. For this reason, these usefulness indicators are collected, established and evaluated before and after each contribution, then periodically so as to track the change over time.

To collect these usefulness indicators, a certain amount of characteristic data collected by the collaboration platform during the contribution process is collected (volume of data, numbers, presence of keywords, clicks on areas of the human/machine interface, etc.). Parameterized requests are also submitted to Internet servers, in which the responses are analyzed so as to extract the characteristic data considered to be useful (for example, the plagiarism rate of a contribution). It is also possible to submit all or some of the contents of the contributions, associated specific data or works to expert systems, in which the diagnosis will be analyzed so as to extract the characteristics considered to be useful (for example, the relevance rate of a contribution extracted from the semantic analysis of said contribution and the work).

Parameterization Interface

The parameterization interface makes it possible to define the valuation indicators and parameters.

Tools

A parameterization interface can include, for example:

Check boxes for each of the usefulness indicators to be taken into account,

Measuring instruments assigned to each usefulness indicator, enabling the sensitivity of the algorithm to each one to be adjusted, Numeric value fields assigned to the coefficients, A control panel of characteristics of the algorithm: classification of usefulness indicators according to their influence on the result, singularities, optimums, average of results based on all combinations of usefulness indicators, standard deviation, etc.

compensation simulation tools, tools for assisting in parameterization according to a strategy: defining minimum hourly compensation, limiting the ratio between maximum and minimum hourly compensations, maximizing the average or median compensation, setting to zero any compensation below a certain threshold, allowing contributors to decide how to define their own strategy for optimizing their compensation, etc.

template stability verification tools: in particular if the contributors have the option of defining their personal strategy, it is possible for the strategy definition loop to be unstable.

Parameterization Operators

The parameterization interface can be accessible and modifiable by a manager (administrator or steering committee) or by the contributors, directly or by means of a vote or by processing the options defined in their personal interface.

To facilitate the parameterization of the algorithm, the parameterization interface can enable the display and parameterization of usefulness variables.

Intermediate Parameters

These usefulness variables are calculated by a sub-function of the algorithm on the basis of usefulness indicators or other usefulness variables, for example:

Service=F(Content, Relevance, Networking)

Confidence=F(Reputation of the Contributor, Reputation of the contribution, Coherence, Proximity of the contributor, Responsibility)

Content=F(Type of content, Type of contribution, Amount of content added, Quality of content added, Time spent, Contribution number, Stated value)

Relevance=F(Timeliness of the content, Cyclicality of the content, Amount of content preserved, Amount of content reworded, Amount of content enriched, Lifetime)

Networking=F(Links from the contribution, Links to the contribution)

Reputation of the contributor=F(Recommendations, Network, Number of contributions, Explicit rating of contributions, Implicit rating of contributions, Number of comments, Rating of comments)

Reputation of the contribution=F(Explicit rating of the contribution, Implicit rating of the contribution, Acceptance/Rejection of the contribution, Number of sources)

Coherence=F(Profile of the author, Profile of the contribution)

Proximity of the contributor=F(Relational proximity, Proximity of interests, Proximity of values)

Responsibility=F(Service guarantee, RSE, Charter)

Feedback Function

The parameterization interface makes it possible to modify the valuation parameters according to contributions (such as comments and votes) left by the contributors when consulting values of various contributions in their personal interface.

Personal Interface

The personal interface of each contributor essentially enables the contributor to make his or her contributions.

It can also enable each contributor to define his or her skill profile (Set of job or field skills of a contributor, possibly combined with a rating or an objective), his or her professional accomplishments and related recommendations, to display his or her contributions provided on the collaboration platform or in progress, calls for contributions transmitted or received and tracking thereof, an estimate of future compensations, previous compensations, hourly compensations per work, etc.

The skill profile can be defined implicitly:

By means of semantic analysis and extraction of keywords and lexical corpus of contributions (see website 123people.fr)

By means of a questionnaire such as: "which phrases describe you?"

By means of the choice of keywords clicked in a magic wheel, in which each click refreshes the list of words in the wheel The skill profile can be modified by each contributor according to information relating to his or her professional profile (see Linkedin.com) or achievements that he or she wishes to highlight, by means of editing tools, manual or programmed filtering tools, rating tools, etc.

It is possible to define the contribution strategy so as to filter the works searched or the calls for contribution received according to social proximity or recommendation of participants in the work, the main usefulness indicators of the algorithm of said work, etc.

It is possible to define the compensation strategy so as to promote a given type of compensation, to give preference to works with greater compensation, to give preference to a more short-term compensation outlook, etc.

It is possible to define the progression strategy in the skill profile so as to receive more calls for contributions on this topic, which will give the contributor the opportunity to improve the rating of his or her skill profile. The progression strategy can be matched with a calendar, goals, tracking tools and learning tools in the context of university or professional education.

Calls for contributions can be explicit, i.e. formulated by a contributor, or implicit, i.e. deduced by a software program on the basis of explicit or implicit skill requirements of a project, the presumed skill profile of contributors, their progression strategy, social proximities of contributors, etc. Calls for contributions can be public, private or targeted by hub, according to filters, etc. They can be matched with a calendar (transmission, deadline to express interest, pre-contribution deadline, contribution deadline, evaluation deadline, etc.) or a call for action (meeting request, social relationship request, clarification request, etc.).

A prediction market can enable the contributors to bet on the future exchange value or updated value of a work. A future compensation market can make it possible for an investor to contribute the monetary portion of his or her future compensation with a discount, or for contributors to exchange future compensation cross-agreements in order to distribute their risks.

The personal interface enables each contributor to display the value of one or more contributions to one or more works and to provide votes and comments (more generally new contributions) concerning these valuations. These new contributions can be used by the parameterization interface in order to develop the valuation parameters that will enable the contribution values to be recalculated (feedback function).

Computational Algorithm

The algorithm makes it possible to calculate the usefulness value of each contribution to a work on the basis of the value of the usefulness indicators determined and the change thereof over time. It is a mathematical function of which the arguments are the usefulness indicators and the variations thereof.

An algorithm can be defined by work, by work phase (ideation, design, feasibility study, etc.) by work portion, by type of contributor (co-author, administrator, marketer), etc.

The functions of an algorithm can be linear, polynomial or integrate any programmable mathematical function.

Embodiments

The method according to the invention can vary according to the works, as it is illustrated in the embodiments below.

An encyclopedia such as Wikipedia, optionally taken in combination with a social network such as LinkedIn, can technically lead to compensation for contributors according to the method described below.

In the following formulas:
The usefulness value of the contribution k to be determined will be denoted $VUk$.
$[i=1\sim n]$ resulting from a sum or an average means that the index i takes all of the values from 1 to n, in which n is the number of contributions taken into account in the calculation.

For practical use in the calculation of compensations, the result $VUk$ may be "standardized", i.e. expressed as a percentage of the total sum of the values of contributions by the formula:

$$VUk\% = VUk/\mathrm{Sum}\,VUi[i=1'\sim n]$$

Each indicator can be re-processed so as to:
1. eliminate fraud attempts by dishonest users. ROBINSON describes, for example, how to re-process votes in particular when some of them deviate too far from the average.
2. Standardize results. It is possible to re-process, for example, votes transmitted by a given contributor who is always stricter (or softer) than the average.

Embodiment No 1—Size of Contributions

The usefulness value of a contribution is measured according to the preserved content of each contribution added to the final result of the specific data. The algorithm is written as follows:

$$VUk = QCCk$$

If the Wikipedia consultation led to a payment, this payment could be distributed pro rata according to the usefulness values of each contribution k expressed as a percentage, and paid to each contributor k.

Example Shown:

TABLE 1

| Contribution n° | Result of the contribution | More bytes | Fewer bytes | QCC (*) |
|---|---|---|---|---|
| 3 | Wikipedia is the largest encyclopedia in the world | +16 | −9 | 16 |
| 2 | Wikipedia is a very large encyclopedia | +26 | −13 | 19 |
| 1 | Wikipedia is a dictionary | +29 | −0 | 14 |

(*) number of bytes remaining in the last version.

Embodiment No 2—Importance of a Contribution by Semantic Analysis

In embodiment No 1, the importance of a contribution is measured by the single volume of specific data preserved in the final work. This approach can be refined by a compared measurement of topics addressed by a contribution and the final work according to the following algorithm:

$$VUk = (QCCk + QCEk)$$

Embodiment No 3—Lifetime of the Contribution

In embodiment No 1, only the amount in bytes measures the usefulness value. However, the long lifetime of a contribution before modification indicates that the readers do not feel the need to modify it, and therefore that it is that much more useful.

To integrate this indicator, and by introducing a constant $DURo$, the algorithm becomes:

$$VUk = (QCCk + QCEk) \times (DURk + DURo)$$

Embodiment No 4—Reputation of the Contributor

In embodiment No 3, the qualitative criterion is provided by any contributor independently of his or her reputation and qualification. A higher weighting can therefore be assigned to the rating transmitted by a contributor with a better reputation or qualifications.

$$VUk = (QCCk + QCEk) \times (DURk + DURo) \times (RECk + RESk + AUTk)$$

Embodiment No 5—Proximity of Contributors

It is possible to refine the usefulness value according to the proximity of the author to the other contributors.

$PXRki$ and $PXIki$ are used to denote the relational and interest proximities of contributors k and i, with the value increasing with proximity:

$$VUk = (QCCk + QCEk) \times (DURk + DURo) \times (RECk + RESk + AUTk) \times \mathrm{average}(PXRki + PXIki)[i=1\sim n]$$

Embodiment No 6—Rating of the Work

It is possible to refine the usefulness value according to the variation over time (derivative) of the explicit or implicit rating of the work, as follows:

$$VUk = (QCCk + QCEk) \times (DURk + DURo) \times (RECk + RESk + AUTk) \times (dNOXk + dNOOk + dNMMk) \times \mathrm{average}(PXRki + PXIki)[i=1\sim n]$$

Embodiment No 7—Contribution to a 3D Object

A work can be a 3D object, for example, in Second Life, consisting of 3D objects produced by separate contributors, in which said contributions each consist of the aggregation of a defined number of primary 3D forms (cone, sphere, cylinder, parallelepiped, etc.). This number QCA can constitute a usefulness indicator, according to the following approach:

$$VUk = QCAk$$

Embodiment No 8 Contribution to a Computer Program

A work can be a computer program, for example, open source, consisting of computer modules produced by separate contributors, in which said contributions each consist of the programming of a defined program volume QCA, measured in bytes:

$$VUk = QCAk$$

Embodiment No 9—Parameterization of the Algorithm by Vote

Some collaboration platforms include the assignment of points to contributors. One possible method is described by international publication WO 2008151161.

This approach may however introduce a managerial bias, since the intrinsic motivation of the project, i.e. to complete a common work, may be corrupted by the individual interest in winning points. It may therefore be beneficial not to immediately reveal the points system or the parameterization of the algorithm. In this case, to avoid any suspicion by contributors regarding the decision-making of this system or parameterization, said contributors may be invited through their personal interface 233 to vote at the end of the project in order to establish this system or parameterization by means of the module 430.

With:
INDj=indicator number j among m
VPj=weighting value of the indicator j=average of values transmitted by contributor votes
The usefulness value of the contribution k can be written:

$$VUk = \text{sum}(VPj \times INDjk)$$

Example Shown
In the table 2 below:
the rows present the reference contributions 1 to N and the weighting value VP of each indicator
the columns present the four usefulness indicators QCC, QCE, DUR and REC; the usefulness value of each contribution by value and by percentage

TABLE 2

| Contribution | QCC | QCE | DUR | REC | VU Usefulness value | VU % |
|---|---|---|---|---|---|---|
| 1 | 2 | 8 | 6 | 4 | 56 | 19% |
| 2 | 0 | 4 | 8 | 3 | 32 | 11% |
| 3 | 0 | 3 | 1 | 2 | 18 | 6% |
| 4 | 0 | 2 | 6 | 4 | 28 | 9% |
| 5 | 6 | 9 | 8 | 7 | 93 | 31% |
| 6 | 0 | 3 | 4 | 4 | 29 | 10% |
| ... | | | | | | |
| N | 2 | 2 | 0 | 6 | 40 | 14% |
| Weighting value VP | 5 | 3 | 1 | 4 | Total: 296 | 100% |

Embodiment No 10—Parameterization of the Algorithm by Experience

Artificial intelligence makes it possible to define a parameterization by experience.

A learning system is, for example, described in U.S. Pat. No. 6,212,528 owing to a "Case-based reasoning system" which defines:
P3 L65 a case base as a set of records and an attribute of a case as a field of this case
P3 L27 a score defining the proximity of a specific case ("incident") with each reference case
P3 L34 the reference case closest to the specific case, identified by the best score Similarly, the module 430 according to the invention can make it possible to define a case base in which each case is a contribution and each attribute is a usefulness indicator. Therefore, after having defined the usefulness value of reference contributions, the usefulness value of a specific contribution can be defined by proximity with the closest reference contribution(s).

Example Shown:
In the table 3 below:
the rows present the reference contributions 1 to N and the specific contribution
the columns show the m usefulness indicators QCC, QCE, ... to INDm; the usefulness value of each contribution; the proximity score of the specific contribution to each reference contribution
the proximity is calculated by the least squares method, i.e. by the function: score=$(QCCk-QCC1)^2 + (QCEk-QCE1)^2 + \ldots + (INDmk-INDm1)^2$
the proximity is better when the score is low

TABLE 3

| Contribution | QCC | QCE | DUR | REC | ... | INDm | VU Usefulness value | Score |
|---|---|---|---|---|---|---|---|---|
| 1 | 2 | 8 | 6 | 4 | | 2 | 6 | 50 |
| 2 | 0 | 4 | 8 | 3 | | 7 | 4 | 82 |
| 3 | 0 | 3 | 1 | 2 | | 9 | 1 | 71 |
| 4 | 0 | 2 | 6 | 4 | | 4 | 8 | 46 |
| 5 | 6 | 9 | 8 | 7 | | 9 | 2 | 199 |
| 6 | 0 | 3 | 4 | 4 | | 3 | 7 | 26 |
| ... | | | | | | | | |
| N | 2 | 2 | 0 | 6 | | 4 | 5 | 54 |
| specific contribution k | 1 | 4 | 2 | 0 | | 1 | Desired value = 7.2 | |

The three reference contributions that minimize the score are numbered 6, 4 and 1.
The usefulness value of the specific contribution k is calculated by the formula:

$$VUk = 3/6 VU6 + 2/6 VU4 + 1/6 VU1 = 7.2$$

$$VUk = 7.2$$

Embodiment No 11—Parameterization of the Algorithm by Prediction Market

A work being developed can be scored at any time owing to prediction market tools. The value of the score constitutes a first indicator NOX. The degree of completion of the work, a ratio expressing in percentage the amount completed at present over the amount completed at the end, constitutes a second indicator NOO.

Si NOXk is the score after contribution k and dNOOk is the variation in the degree of progress after contribution k,
The usefulness value of the specific contribution k can be calculated by the formula:

$$VUk = NOXk \times dNOOk$$

Example Shown:

TABLE 4

| Contribution | NOX | NOO | dNOO | VU | VU % |
|---|---|---|---|---|---|
| 0 | 0 | 0 | | | |
| 1 | 20 | 20% | 20% | 4 | 13% |
| 2 | 30 | 50% | 30% | 9 | 30% |
| 3 | 34 | 100% | 50% | 17 | 57% |
| total | 84 | | 100% | 30 | 100% |

Extensions
Register: in addition to the routine tracing of contributions in Wikipedia, contributions can be the subject of a supervised register.

Confidentiality: the collaboration platform can implement confidentiality by parties: contributions that are private, public, targeted, accessible under conditions, etc.

Collaboration tools: the collaboration platform tools can include wikis, forums, blogs, micro-blogs, social networks, comments, votes, questionnaires, calls for contributions, contests, text editing tools, 2D or 3D graphics, software, etc.

Multiple usefulness value: a contribution can have a plurality of usefulness values, in particular when it is involved in a plurality of works.

Subjective usefulness value: the usefulness value can vary according to the user. The usefulness of a contribution can, for example, be high for a user who has great confidence in the credibility of an author and low for another user who does not know this author. It is thus possible to consider developing a usefulness value calculated only when the user(s) have been identified (see in particular indicators PXR, PXI and PXV)

Composite usefulness value: the usefulness value can be composite if one of the usefulness indicators is composite, established, for example, by:
  a qualitative writing assessment according to a plurality of criteria: "what ratings do you give this article? Expression, Clarity, Originality, Passion, Precision, Conviction, etc."
  a qualitative job assessment according to a plurality of criteria: "what is the greatest benefit of this article? Intuition, Idea development, Sharing of expertise, Confrontation, Marketing analysis, Popularization, etc."

Composite compensation: the compensation can be composite if the usefulness value is composite: increased recognition as an illustrator, good rating as a popularizer, recommendation as Project Manager, etc.

Advanced administrative interface: the administrative interface can make it possible to display contributions by work, by work phase or by contributor. For each work or phase, it can make it possible to set a state of progress and an exchange value upon completion, in order to calculate an estimate of future compensations for contributors.

Computer resources: the modules and functions of the collaboration system can be distributed among a plurality of sites and a plurality of computers as has become conventional in "grid computing" and "cloud computing" architectures.

Comprehensive platform: the collaboration platform can, by extension, be the World Wide Web as a whole. An intangible compensation can thus, for example, be calculated on the basis of all of the contributions of an author on the Internet. The collaboration platform can also consist of a defined list of websites or a type of website. The reputation can thus, for example, be consolidated by all of the contributions of an author in all specialized blogs, found by a search engine such as Google.

The invention claimed is:

1. A method for valuating at least one collaborative content contribution to collective work relating to a collaborative multimedia work, the at least one contribution being performed by one or more contributors on a contributor computer system connected via a network to a collaboration platform computer architecture, the method comprising steps of:

defining, by the collaboration platform computer architecture, a list of a plurality of different usefulness indicators stored for access by the collaboration platform computer architecture, the usefulness indicators of the list being different measurable quantities that quantifies a usefulness of the at least one collaborative content contribution;

collecting, at the collaboration platform computer architecture, usefulness indicators from the list of the plurality of different usefulness indicators for each collaborative content contribution of the at least one collaborative content contribution to the collective work, the usefulness indicators being received from the contributor computer system;

calculating by the collaboration platform computer architecture the usefulness value for each collaborative content contribution of the at least one collaborative content contribution to the collective work according to the at least one usefulness indicators collected for each collaborative content contribution and storing the usefulness values for access by the collaboration platform computer architecture;

associating, by the collaboration platform computer architecture, with each collaborative content contribution of the at least one collaborative content contribution to the collective work a compensation value according to the usefulness value of each contribution and storing the compensation value for access by the collaboration platform computer architecture.

2. The method of claim 1, wherein each usefulness indicator of the at least one usefulness indicators is determined in relation to a feature of the at least one contribution, a specific data of the at least one contribution, the collective work, or the one or more contributors of the at least one contribution.

3. The method of claim 1, wherein defining the list is performed through a parameterization interface of the collaboration platform computer architecture by selecting or not selecting each usefulness indicator of the set of usefulness indicators.

4. The method of claim 3, wherein calculating the usefulness value for each contribution is performed by inputting to a calculation, only a sublist of the list of the usefulness indicators which are collected, the sublist being defined according to a vote by the one or more contributors received by the collaboration platform computer architecture from the contributor computer system.

5. The method of claim 1, wherein the compensation value associated with each contribution is a function of a standardized usefulness value, the standardized usefulness value being computed by the collaboration platform computer architecture as being a computed usefulness value of each contribution divided by a total sum of the computed usefulness values of each contributions of the at least one contribution to the collective work.

6. The method of claim 5, wherein a global compensation for the collective work is computed by the collaboration platform computer architecture, each compensation value being a part of the global compensation proportionally to the standardized usefulness value associated with each contribution.

7. The method of claim 1, wherein defining the list of at least one usefulness indicators among a set of usefulness indicators further comprises defining a list of at least one valuation parameter, the step of calculating a usefulness value being performed according to the at least one valuation parameters defined in the list of at least one valuation parameter and stored for access by the collaboration platform computer architecture.

8. The method of claim 1, wherein the usefulness indicators are collected by the collaboration platform computer architecture periodically and/or each time a contribution is performed.

9. The method of claim 1, further comprising displaying, on a display module, stored usefulness values by the collective work, the at least one contribution, and/or the one or more contributors.

10. A collaboration system for enabling a plurality of contributors having contributor computer systems connected to a collaboration platform computer architecture via a network to achieve at least one collective work by performing at least one contribution and transmitting said at least one contribution from a respective contributor computer system to the collaboration platform computer architecture, the collaboration system comprising:

the collaboration platform computer architecture for valuating the at least one contribution to the collective work, the collaboration platform computer architecture comprising one or more processors tied to memory, wherein:

the one or more processors are configured to define a list of a plurality of different usefulness indicators stored in the memory for access by the collaboration platform computer architecture, the usefulness indicators of the list being different measurable quantities that quantifies a usefulness of the at least one collaborative content contribution;

the one or more processors are configured to collect usefulness indicators from the list of the plurality of different usefulness indicators for each collaborative content contribution of the at least one collaborative content contribution to the collective work, the usefulness indicators being received from the contributor computer system;

the one or more processors are configured to calculate the usefulness value for each collaborative content contribution of the at least one collaborative content contribution to the collective work according to the at least one usefulness indicators collected for each collaborative content contribution and storing in the memory the usefulness values for access by the collaboration platform computer architecture;

the one or more processors are configured to associate, with each collaborative content contribution of the at least one collaborative content contribution to the collective work a compensation value according to the usefulness value of each contribution and storing the compensation value in the memory for access by the collaboration platform computer architecture.

11. The collaboration system of claim 10, further comprising:

the plurality of contributor computer systems, wherein each of the plurality of contributor computer systems hosts a personal interface enabling each contributor to perform contributions through the network after authentication.

12. The collaboration system of claim 11, wherein the personal interface comprises interface elements enabling each contributor of the one or more contributors to define a skill profile.

13. The collaboration system of claim 11, wherein the personal interface comprises interface elements enabling each contributor of the one or more contributors to display its contributions to the collaboration platform computer architecture and/or its compensation values.

* * * * *